Figure 1:
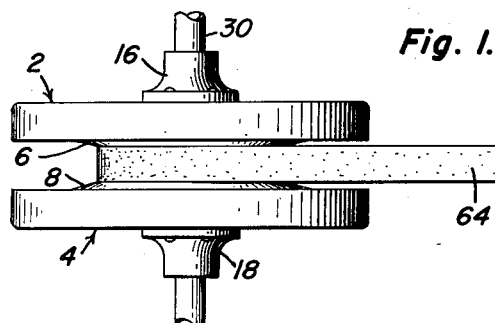
Figure 1:
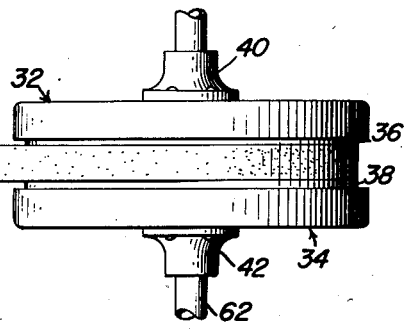

Nov. 16, 1954 — C. T. HULTIN — 2,694,316
VARIABLE SPEED DRIVE
Filed June 8, 1951 — 3 Sheets-Sheet 1

Inventor
Clifford T. Hultin
By Clifford T. Hultin
Attorney

Nov. 16, 1954 C. T. HULTIN 2,694,316
VARIABLE SPEED DRIVE
Filed June 8, 1951 3 Sheets-Sheet 2

Inventor
Clifford T. Hultin

By Clifford T. Hultin

Attorney

Nov. 16, 1954  C. T. HULTIN  2,694,316
VARIABLE SPEED DRIVE
Filed June 8, 1951  3 Sheets-Sheet 3
Fig. 8.
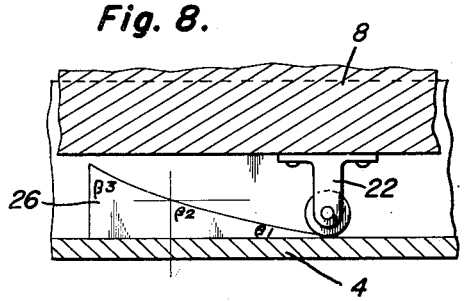
Fig. 9.
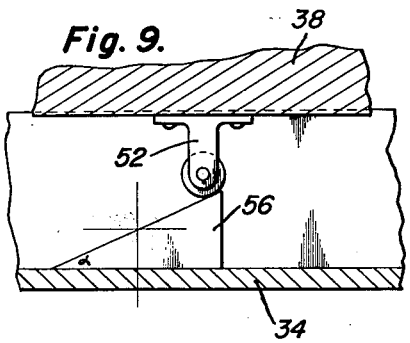
Fig. 10.
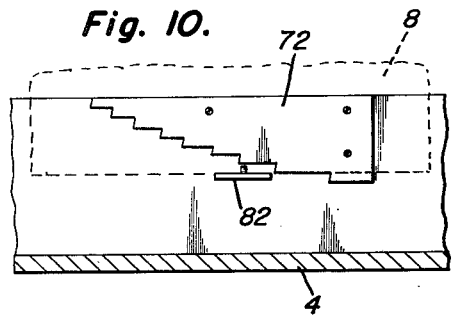
Fig. 11.
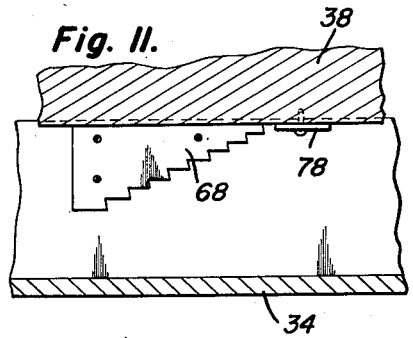
Fig. 14.
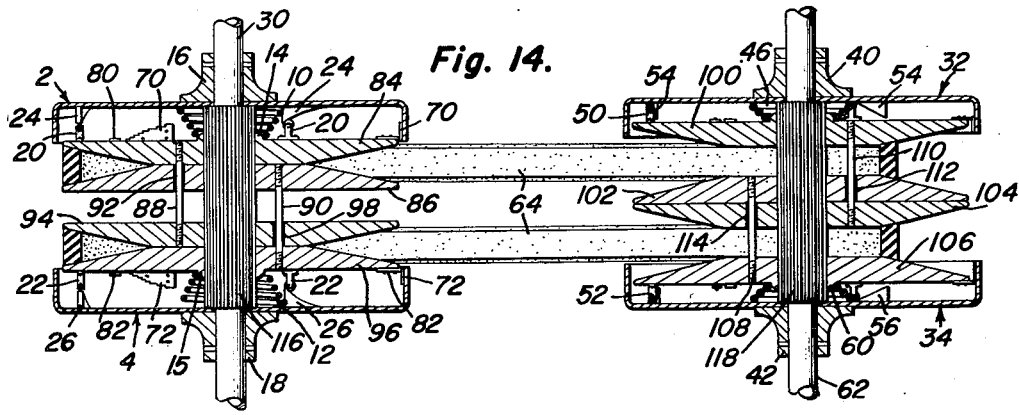
Fig. 15.
Inventor
Clifford T. Hultin
By Clifford T. Hultin
Attorney

# United States Patent Office 2,694,316
Patented Nov. 16, 1954

2,694,316

VARIABLE SPEED DRIVE

Clifford T. Hultin, Arlington, Va.

Application June 8, 1951, Serial No. 230,677

8 Claims. (Cl. 74—230.17)

(Granted under Title 35, U. S. Code (1952), sec. 266)

The invention described herein may be manufactured and used by or for the Government for governmental purposes, without the payment to me of any royalty thereon.

This invention relates to a variable speed transmission wherein the drive ratio is automatically varied in accordance with the load.

An object of the invention is to provide a V-belt drive wherein the pitch diameter of the driver and driven pulleys are automatically varied as a result of the torque imposed by the load. An additional object of the invention is to provide a variable ratio V-belt drive wherein the belt tension may be automatically varied to accommodate the applied load. Again an object of the invention is to provide an automatically variable V-belt drive wherein a power source having a relatively constant R. P. M. and power output may be used to drive a load subject to great torque variation.

These and other objects are accomplished by means of a drive comprising 2 V-pulleys and connecting belt, the pulleys being split into two (2) halves forming 2 frusto-conical sections per pulley. These two sections are constantly being forced together by a set of cams and cam followers when the drive is transmitting power. This pressure plus that of a set of supplementary springs, determines at once both the tension on the belt as well as the relative pitch diameters of the two pulleys at any given load. Thus, for any particular torque load there will be a pitch diameter of driver and driven pulleys where the pressures on the respective pulley cones are such that the system is in equilibrium. If the torque changes from this equilibrium value, then the pressure on the cones of one pulley will exceed that of the other to the point where the first pulley will increase its pitch diameter at the expense of the second pulley until a new equilibrium is again established for the system. This inverse change in pitch diameters of the two pulleys follows from the fact that the belt length as well as the distances between pulley centers remains constant. In addition to the fact that the effective pulley diameters are thus interrelated, the cam sections within each pulley can be given a contour such that the belt tension can be given any value that may be desirable. The ideal situation is attained when the belt tension is only great enough to pull the load without slipping.

Figure 5:
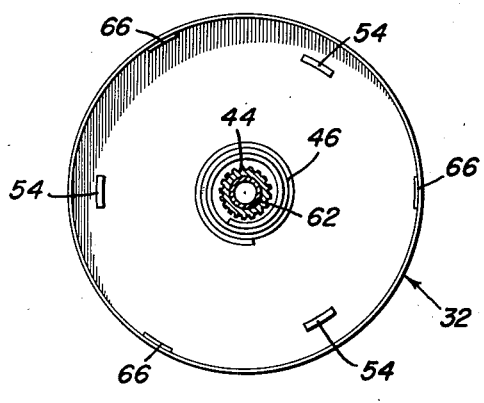
Figure 6:
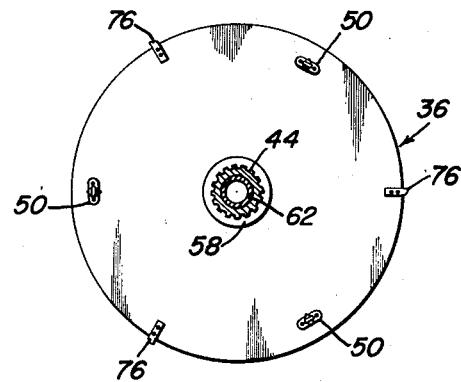
Figure 7:
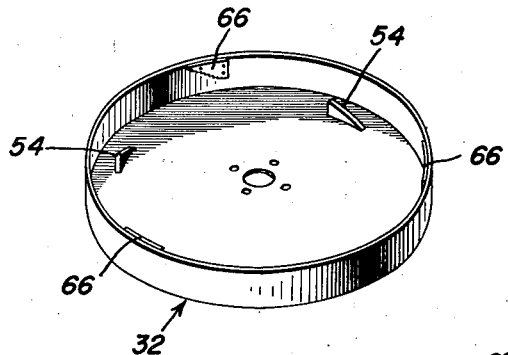
Figure 13:
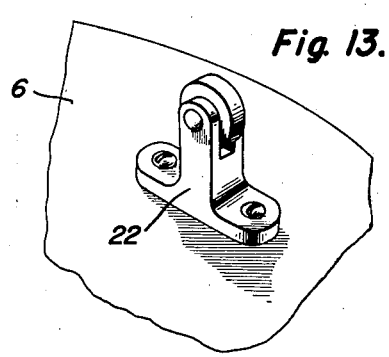
Figure 2:
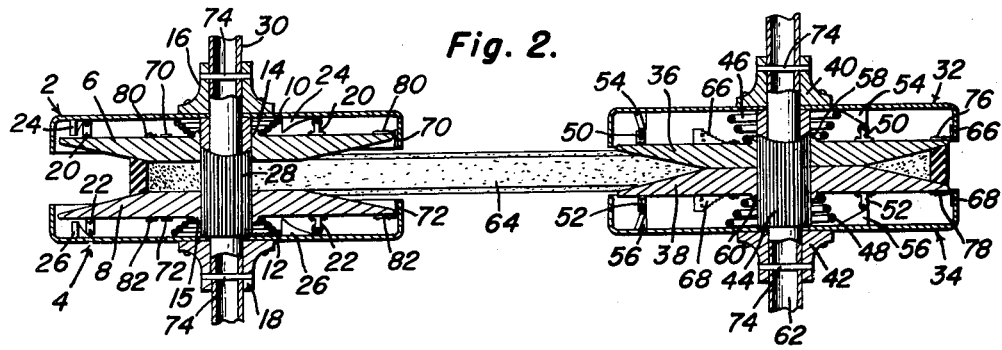
Figure 3:
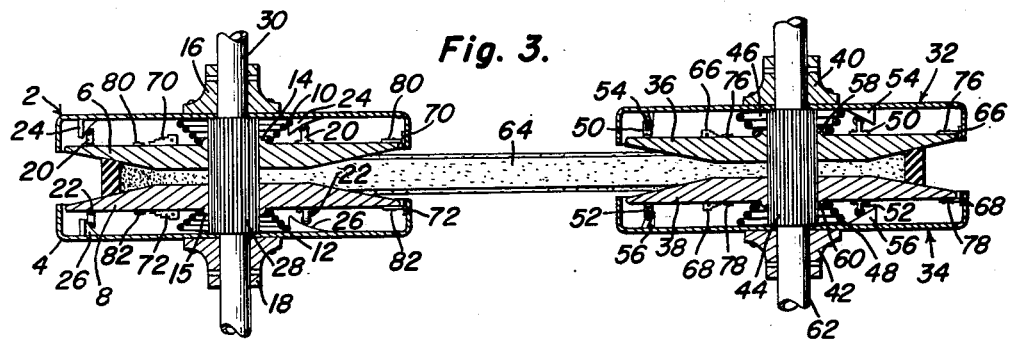
Figure 4:
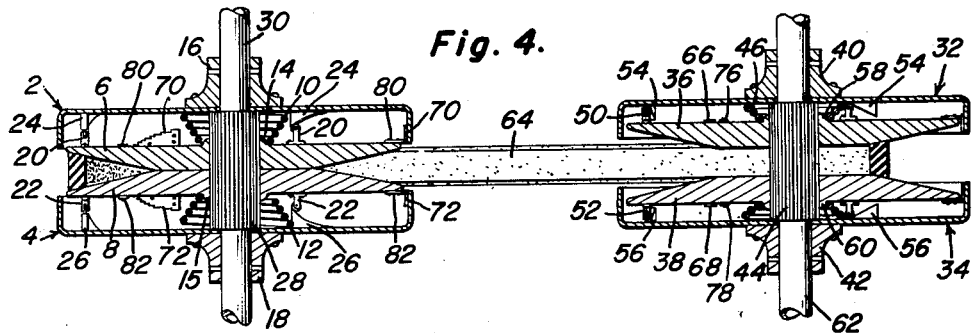
Figure 12:
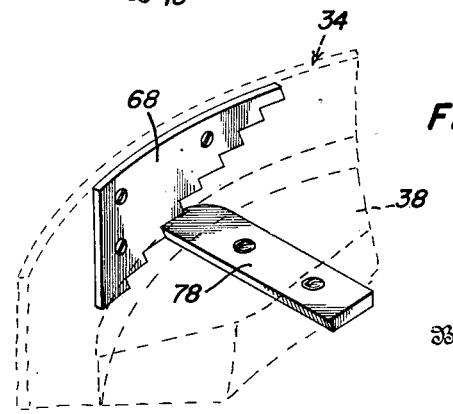

In the drawings, Fig. 1 shows a top view of the drive. Figs. 2, 3 and 4 show sectional views of the two pulleys and connecting belt with three drive ratios between the two pulleys. Fig. 5 is a view looking into one of the driving drums and showing an end sectional view of the drive shaft, splined sleeve and spring. Fig. 6 shows the front view of one of the cones constituting one of the halves of the driving pulley. Fig. 7 is a perspective view of the drum of Fig. 5. Fig. 8 is a detailed view of a cam and follower in the driven pulley. Fig. 9 is a similar view of a cam and follower in the driver pulley. Figs. 10 and 11 are views of the reverse sector plate and reverse blade in the driven and driver pulleys respectively. Fig. 12 is a perspective view of the reverse sector plate and reverse blade in the driver pulley. Fig. 13 is a perspective view of a roller cam follower. Fig. 14 is a sectional view of a pulley system uitlizing double pulleys. Fig. 15 is a perspective view of one of the cones in a double pulley system.

In the Figures 2 and 4 are the two drums of the driven pulley; 6 and 8 are the two frusto-conical sections constituting the sheave of the driven pulley; 10 and 12 are compression springs between the drums and cones of the driven pulley; 14 and 15 are extensions adjacent the shaft on the outer faces of the cones of the driven pulley; 16 and 18 are hubs on the two drums; 20 and 22 are roller cam followers on the two pulley cones; 24 and 26 are concave cams attached to the drums of the driven pulley; 28 is a splined sleeve mounted for free rotation on shaft 30 in the driven pulley; 32 and 34 are the drums of the driver pulley; 36 and 38 are the two frusto-conical sections constituting the sheave of the driver pulley; 40 and 42 are hubs on the drums of the driver pulley; 44 is a splined sleeve mounted for free rotation on shaft 62 in the driver pulley; 46 and 48 are compression springs between the drums and cones of the driver pulley; 50 and 52 are roller cam followers on the two pulley cones; 54 and 56 are straight sided cams attached to the drums of the driver pulley; 58 and 60 are flange extensions adjacent the shaft on the outer faces of the cones of the driver pulley; 62 is the shaft in the driver pulley; 64 is the connecting V-belt between the two pulleys; 66 and 68 are notched reverse sector plates in the driver pulley; 70 and 72 are notched reverse sector plates in the driven pulley; pins 74 serve to fixedly attach the several hubs to the respective shafts; 76 and 78 are reverse blades attached to the pulley cones of the driver pulley; 80 and 82 are reverse blades attached to the pulley cones of the driven pulley; 84 is one outer pulley cone of the driven pulley of the dual belt drive shown in Fig. 14; 86 is an inner pulley cone in the same driven pulley; 88 and 90 are rods connecting the alternate inner to the outer cones in the same driven pulley; 92 is an enlarged hole in an inner pulley cone permitting a connecting rod to move freely therethrough; 94 is an inner pulley cone in the driven pulley; 96 is an outer pulley cone in the driven pulley; 98 is an enlarged hole in the pulley cone permitting a connecting rod to move freely therethrough; 100 and 106 are the outer cones of the driver pulley of Figure 14; 102 and 104 are the two inner cones in the same pulley; 108 and 110 are rods connecting the alternate inner to the outer cones in the same driven pulley; 112 and 114 are enlarged holes in the inner pulley cones permitting a connecting rod to move freely therethrough; 116 and 118 are splined sleeves mounted for free rotation on shafts 30 and 62 in the driven and driver pulleys respectively.

The driver pulley is assembled by placing the splined sleeve 44 on shaft 62 and sliding the two pulley cones 36 and 38 on to the splined sleeve. The hole in each pulley cone is internally splined to fit the splined sleeve. The pulley cones of the driver pulley are fitted with roller cam followers 50 and 52 and reverse blades 76 and 78; alternate units being spaced 60° apart around the circumference as shown in detail in Figure 6. Springs 46 and 48 are then positioned, one on each side of the pulley cones and the cam drums 32 and 34 with their attached hubs 40 and 42 are assembled on the main shaft.

The drums are positioned up against the splined sleeve thereby compressing the coil springs 46 and 48 and the drums are fastened to the shaft 62 by means of pins 74. The drums are each equipped with cams 54 and 56 and reverse sector plates 66 and 68, alternate units of which are placed 60° apart around the drum as shown in Figure 7.

The driven pulley is assembled similarly and differs from the driver pulley only in that springs 10 and 12 are relatively soft and are used for biasing purposes only. Also cams 24 and 26 are longer than cams 54 and 56 and also have a concave shape as shown in Figure 8. Another difference between the driver and driven pulleys is that the reverse sector plates 70 and 72 in the driven pulley are slightly convex in contour rather than straight as is the case with the driver pulley plates 66 and 68. These plates are shown in detail in Figures 10 and 11. In each case these reverse plates have a contour which complement the contour of the cam shape, thus in the driven pulley the cam is concave and the reverse plate is convex (Figures 8 and 10) whereas in the driven pulley both are straight (Figures 9 and 11). The cams are of such height that when the roller cam followers are almost at the top of the cam, the two pulley cones will make contact, thereby preventing the cam followers from overriding the cams.

As shown in Figs. 2, 3, and 4, the two pulleys are connected by means of a V-belt of such length that when one pulley is at a maximum pitch diameter, the other pulley is at a minimum pitch diameter. This relationship of belt length to pulley diameter means that for any position of the cam followers to the cams in one pulley, there is a corresponding position in the other pulley. The slope of the cams are therefore correlated to give the precise characteristics to the drive that may be desired.

The operation of the device is as follows: when a load is placed on the driven pulley and power is applied to the driver pulley, the cams in the drums engage the cam followers on the two cones. These followers produce two components of force on the cones; one which tends to turn the cones in the direction of the rotating shaft and drums and the other which tends to compress the cones together. These forces grip the belt and move the same over the driven pulley.

When there is no load on the drive, springs 46 and 48 will compress the cones of the driver pulley and make this a maximum pitch diameter. This appropriates the belt from the driven pulley and makes the latter's pitch diameter a minimum due to the fact that the tension of springs 10 and 12 is less than that of springs 46 and 48. Accordingly, the drive ratio, in terms of the speed of the driven pulley is at a maximum when there is no load on the system. When a load is applied to the system, the behavior of the pitch diameters of the pulleys and therefore of the drive ratio is dependent on the relative compression forces exerted by the cams in the respective pulleys in combination with the compression forces exerted by the springs.

In the embodiment shown, the cams on the driver pulley have a constant slope or angle $\alpha$ and the torque ($T_1$) on the driver pulley is maintained substantially constant. Moreover, springs 46 and 48 are relatively stiff as compared to springs 10 and 12. The actual value of the angle $\alpha$ is largely determined by the belt tension desired. The angle is made as large as possible consistent with the necessary belt tension to drive the load since a large angle permits a more ready variation of the relative pitch diameters of the pulleys.

The slope or cam angle of the driven pulley is a changing one and it will suffice for purposes of description to illustrate three separated points on this cam. These points will be at each extremity and in the center of the cams, which positions will correspond to the extreme high and low drive ratios as well as a 1 to 1 ratio which obtains when the pitch diameters of the two pulleys are equal. For convenience, we shall consider the latter ratio first.

In order that equilibrium shall be established, it is necessary that the pressures on the cones of the two pulleys shall be essentially equal. Since we have assumed a constant torque and a constant cam angle for the driver pulley, therefore the cam pressures on this pulley will be essentially constant throughout the various pitch diameters of the pulley and this component of force will vary inversely as the tangent of the angle $\alpha$, as will be seen from a study of Figure 9.

Considering now the driven pulley at the midpoint of the cams, it will appear that since the two pulley diameters are equal, the torque will be the same on both pulleys and if there were no spring pressures involved, the angle of the cams in the driver and driven pulleys would have to be the same for equilibrium to obtain. The resultant spring pressure however, is the difference in tension between 46 and 48 on the one hand and 10 and 12 on the other hand and acts in opposition to the cam pressures of the driven pulley, hence the pressures on the latter must equal this component of spring pressure plus the cam pressure on the driver pulley. Because of these spring pressures therefore, the cam angle for the driven pulley at midposition ($\beta_2$) must be less than $\alpha$ by an amount which compensates for this spring pressure.

We proceed next to the condition where the drive ratio is a maximum, that is, the driven pulley pitch diameter is a minimum (Fig. 2). The torque on the driven pulley ($T_2$) is now equal to the torque on the driver $$T_1 \text{ times } \frac{d_2}{d_1}$$

where $d_1$ is the diameter of the driver and $d_2$ the diameter of the driven pulleys. $T_2$ is accordingly much less than $T_1$ and in order to get an approximate equilibrium pressure on the driven pulley cones, the angle of the cams ($\beta_1$) must be considerably less than $\alpha$. Since the pressure of the springs are again added to that of the driver pulley as opposed to the driven pulley, the cam angles $\beta_1$ must be made still smaller to compensate for this spring pressure.

Taking the other extreme of pulley diameters where the driver is a minimum and the driven a maximum diameter, the torque $T_2$ on the driven pulley is again $$T_1 \text{ times } \frac{d_2}{d_1}$$

which value is now greatly in excess of $T_1$. This increased torque will have a tendency to increase the pressure on the driven pulley cones hence the cam angle $\beta_3$ must be greater than $\alpha$ in order that pressure equilibrium may again be established between the two pulleys. The spring pressure must again be compensated for however, which necessitates a slight reduction in this angle size. Normally, however, the tension of springs 46 and 48 will not be great enough to overcome the increased torque on the driven pulley and the angle $\beta_3$ will still be greater than $\alpha$.

In reviewing the three positions on the driven cams which we have analyzed, we find generally that the lower portion of the cams will have an angle substantially less than $\alpha$, at the midpoint of the cams the angle will be slightly less than $\alpha$ and at the highest point of the cams it will be substantially greater than $\alpha$. Thus the cam angle will be a continuously changing one and the cam contour will approach that shown in Figure 8. As a result there is a particular combination of cam angles for any given torque load and only in this position will the pulley system be in equilibrium. Accordingly, if the drive ratio does not conform to the torque obtaining at the moment, a force will immediately appear tending to change the ratio. This can be illusrated as follows: assume that the torque on the driven pulley is the same as that on the driver and that the pulley diameters are equal. The system is now in equilibrium. If the torque of the load suddenly increases, the system becomes unstable. This instability results from the fact that, since angle $\beta_2$ is less than $\alpha$ at midpoint, the increased torque will increase the cone pressures on the driven pulley by a greater amount than on the driver pulley and the moment this pressure difference becomes sufficiently great, the driven pulley will increase its diameter slightly at the expense of the driver pulley. This increase will be limited by springs 46 and 48 because as these springs are compressed in making the driver pulley smaller their tension will increase until it just balances the difference in compression forces exerted by the driver and driven cams. The resulting new drive ratio will stabilize the system until the torque again changes. If instead of an increase in torque we assume a decrease we have a situation which is the reverse of the above, i. e. the decreased torque produces a greater decrease in cone pressure in the driven than in the driver pulley, so that the spring pressure which does not decrease by a like amount, tends to enlarge the diameter of the driver at the expense of the driven pulley. It will be obvious that the same principle holds for any condition of drive ratio.

It will now be evident from these observations that certain design principles should be observed in order that the pulley system shall function in an optimum manner. First of all, for any given drive ratio, the cams on the driven pulley must have a pressure advantage on its cones over that of the cams of the driver pulley on its cones. This advantage is balanced by the springs, the tension of which is independent of torque and is dependent only on the drive ratio obtaining at the moment. The principle of the design is that with increasing torque this spring tension does not increase as fast as the pressure advantage of the driven cams.

It will be obvious to one skilled in the art that several design variations can be made. In considering the spring system, for instance, the biasing springs on the driven pulley can be eliminated, also a single spring can be placed between the driven pulley cones. In the latter instance, this single spring will supplement the pressures of the two springs in the driver pulley and all springs can be made lighter as a result. Moreover by making the single spring in the driven pulley sufficiently large, no springs will be necessary on the driver pulley.

In the suggested design of the cams it was assumed, by way of illustration only, that the driver cams have a constant angle. It is of course equally possible to make the driven cams a constant angle in which case the driver cams would have to have generally a convex shape. The basic requirement is that the lower part of the driven cams have a lesser angle and at the higher portion a greater angle than the corresponding portions of the driver cams. This condition can obviously be met in an unlimited number of cam contours. Within limits, it is the relative cam contours that count, not the shape of the individual cam.

In the design of the cam contours, it must be emphasized that every increase in torque need not produce a corresponding increase in drive ratio. That is, the drive ratio need not be made continuously variable but may have a plurality of ratios wherein the drive is in equilibrium over a limited torque range. In this manner, the drive ratio would approximate the steps of a gear changing mechanism which result may sometimes be desirable.

In the design examples illustrated, it has been assumed that equilibrium between the pulley diameters will obtain when the pressures on the pulley cones are equal in the two pulleys. This will obviously be true when the pulley diameters are equal and the drive ratio is 1 to 1. At the extremes of high and low ratios, the factor of friction may necessitate a slight correction in order that the drive may occupy the extreme high or low position under the desired value of torque. The amount of this correction in the cam angle is easily determined by experiment in a given pulley system.

This suggests that it is important to hold frictional resistance to a minimum in the design of the device. This can be partly assisted by making the cam angles as large as possible consistent with the necessary belt tension. The cam followers may have sliding contact if the cam angles are sufficiently large, otherwise roller cam followers should be used.

The drive as described heretofore, will only function when the pulleys turn in a forward direction. To permit operation in reverse as well, notched reverse sectors are spaced around and attached to the flanges of the cam drums and blade projections 76, 78, 80 and 82 are attached to the outside faces of the respective cones. These projecting blades are slightly beveled on the side adjacent the cone face as seen in Fig. 12. The overall profile of the reverse sectors correspond to that of the cams in the same pulley so that, when the cam followers move over the cam surfaces, the blades will just clear the notches of the sector.

The relationship of the blade sections to the notched sector appears in Figures 10, 11 and 12. If the drive is suddenly reversed, from a forward motion with a resultant reversal of torque in the system, the cam followers will lose contact with the cams since the cam drums would rotate backward until they encountered the next cam follower, which in the principal embodiment would be 120°. To prevent this, the reverse blades and reverse sector plates are arranged in such a position that the reverse blades barely clear the notches on the reverse plates when the pulley system is in normal operation. The moment that there is a reversal of torque, the cam followers will lose contact with the cams, the reverse blades will immediately fall into a notch on the reverse sector thus preventing further movement backwards. This takes place in both driver and driven pulleys and the system will thus become fixed or frozen substantially in the ratio that obtained at the moment of reverse. If the system is again reversed to a forward motion the reverse blades will disengage from the reverse sectors and the cams and cam followers will again make contact upon which, the automatic ratio control will again take over and govern the characteristics of the drive.

A drive of this character has utility in many applications, especially where the torque of the driven load is variable and where a constant speed of the driven load is not important. A relatively constant source of moderate power will thus be able to drive a load having large and variable torque requirements. In this respect the torque and speed characteristics of this drive is quite similar to that of a series electric motor. It follows that this drive would have great utility in installations such as drives for light vehicles and the like. It is admirably suited for motor cycle or cycle car drives utilizing moderate size gasoline engines of two cycle or similar design which function best and most efficiently at a relatively constant speed. With this drive, such engines may be allowed to operate at reasonable, constant speed while the system automatically adjusts the drive ratio to the torque load. High speeds are thus possible on level ground with moderate power and yet steep inclines can easily be negotiated without any control on the part of the driver. In coasting, or descending hills where there is torque reversal, the drive ratio will automatically freeze until forward torque is again established.

Although there is no specific limit to the size of the drive, the maximum practical size is dictated largely by the largest useful belt size available. Where it is desired to transmit more power than can be convenient ly handled by one belt, the drive can be made for a series of parallel belts as shown in Figure 14. This figure shows an adaptation for two belts although any reasonable number of belts can be made to operate in the same way. In this modification for plural belts, the design of drums, springs and outer cones are generally the same as in the single pulley, but the splined sleeve is longer to accommodate additional cones in multiples of two, to the number desired. Alternate cones face in the same direction and are attached together by means of bolts 88, 90, 108 and 110. Each such group is finally attached to the proper outside cone. The bolt fasteners pass through oversize holes 92, 98, 112 and 114 in the alternate series of cones with the result that all the cones on the same side of the respective belts move as a unit. In this way, the pulley diameters for all belts are the same and are governed by the cam and spring action on the outer cones in the same way as in the single pulleys.

It will be obvious to one skilled in the art that numerous variations, in addition to those mentioned, are possible within the scope of this invention.

I claim:

1. A variable speed power transmission comprising variable diameter driver and driven pulleys and a connecting V-belt, said pulleys each comprising two frusto-conical sections, torque sensitive means associated with each of said pulleys serving to apply pressure on the two frusto-conical sections toward each other in proportion to the respective torque loads on said pulleys, the said torque sensitive means comprising a series of angular cam surfaces and cam followers, the said cam surfaces having different angles in the driver and the driven pulleys respectively so that the torque sensitive means of the driven pulley is effective to overcome the said torque sensitive means of the driver pulley for any given torque and for any given pulley diameter ratio of the system.

2. A variable speed power transmission comprising variable diameter driver and driven pulleys and a connecting V-belt, said pulleys comprising two frusto-conical sections each, torque sensitive means associated with each of said pulleys serving to apply pressure on the two frusto-conical sections toward each other in proportion to the respective torque loads on said pulleys, the said torque sensitive means comprising a series of angular cam surfaces and cam followers, the said cam surfaces having different angles in the driver and the driven pulleys respectively so that the torque sensitive means of the driven pulley is effective to overcome the said torque sensitive means of the driver pulley for any given torque and for any given pulley diameter ratio of the system, spring means associated with one of said pulleys opposing the torque sensitive means of the driven pulley.

3. A variable speed power transmission comprising variable diameter driver and driven pulleys and a connecting V-belt, said pulleys comprising two frusto-conical sections each, torque sensitive means associated with each of said pulleys serving to apply pressure on the two frusto-conical sections toward each other in proportion to the respective torque loads on said pulleys, the said torque sensitive means comprising a series of angular cam surfaces and cam followers, the said cam surfaces having different angles in the driver and the driven pulleys respectively so that the torque sensitive means of the driven pulley is effective to overcome the said torque sensitive means of the driver pulley for any given torque and for any given pulley diameter ratio of the system, dual spring means associated with the driver pulley opposing the torque sensitive means of the driven pulley, said dual spring means comprising two springs positioned one outside of each frusto-conical section of the pulley and serving to apply pressure on the two frusto-conical sections toward each other.

4. A variable speed power transmission comprising variable diameter driver and driven pulleys and a connecting V-belt, said pulleys comprising two frusto-conical sections each, torque sensitive means associated with each of said pulleys serving to apply pressure on the two frusto-conical sections toward each other in proportion to the respective torque loads on said pulleys, the said torque sensitive means comprising a series of angular cam surfaces and cam followers, the said cam surfaces having different angles in the driver and the driven pulleys respectively so that the torque sensitive means of the driven pulley is effective to overcome the said torque sensitive means of the driver pulley for any given torque and for any given pulley diameter ratio of the system, dual spring means associated with the driver pulley opposing the torque sensitive means of the driven pulley, said dual spring means comprising two springs positioned one outside of each frusto-conical section of the driver pulley and serving to apply pressure on the two frusto-conical sections toward each other, a second dual spring means in the driven pulley, said second spring means comprising two springs positioned one outside of each frusto-conical section of the driven pulley and serving to apply pressure on the two frusto-conical sections toward each other, said second spring means in the driven pulley being lighter and exerting less pressure than said spring means in the driver pulley.

5. A variable speed power transmission comprising variable diameter driver and driven pulleys and a connecting V-belt, said pulleys comprising two frusto-conical sections each, torque sensitive means associated with each of said pulleys serving to apply pressure on the two frusto-conical sections toward each other in proportion to the respective torque loads on said pulleys, the said torque sensitive means of the driven pulley being effective to overcome the said torque sensitive means of the driver pulley for any given torque and for any given pulley diameter ratio of the system, spring means associated with one of said pulleys opposing the torque sensitive means of the driven pulley, means associated with each of said pulleys which serve to maintain the drive ratio constant on a reversal of torque in the transmission system.

6. A variable speed power transmission comprising variable diameter driver and driven V-pulleys positioned on separate shafts, V-belt connecting said pulleys, each of said pulleys comprising two frusto-conical sections splined to a sleeve freely rotatable on said shafts, flanged drums fixed to said shafts, one on each side of said splined sleeve, a plurality of cams on said drums adapted to contact and actuate a series of cam followers positioned on said frusto-conical sections of the pulleys and serving to apply pressure on the two frusto-conical sections toward each other as torque is applied to the shaft, said cams in the driven pulley being shaped to exert a greater compressing force on the frusto-conical halves of the driven pulley than the cams of the driver pulley, spring means associated with said pulleys which serve to balance the difference in force exerted by the cams of the driver and driven pulleys.

7. A variable speed power transmission comprising variable diameter driver and driven V-pulleys positioned on separate shafts, V-belt connecting said pulleys, each of said pulleys comprising two frusto-conical sections splined to a sleeve freely rotatable on said shafts, flanged drums fixed to said shafts, one on each side of said splined sleeve, a plurality of cams on said drums adapted to contact and actuate a series of cam followers positioned on said frusto-conical sections of the pulleys and serving to apply pressure on the two frusto-conical sections toward each other as torque is applied to the shaft, said cams in the driven pulley being shaped to exert a greater compressing force on the frusto-conical halves of the driven pulley than the cams of the driver pulley, spring means associated with said pulleys which serve to balance the difference in force exerted by the cams of the driver and driven pulleys, means associated with each of said pulleys for maintaining the drive ratio constant on a reversal of torque in the transmission.

8. A variable speed power transmission comprising variable diameter driver and driven V-pulleys positioned on separate shafts, V-belt connecting said pulleys, each of said pulleys comprising two frusto-conical sections splined to a sleeve freely rotatable on said shafts, flanged drums fixed to said shafts, one on each side of said splined sleeve, a plurality of cams on said drums adapted to contact and actuate a series of cam followers positioned on said frusto-conical sections of the pulleys and serving to apply pressure on the two frusto-conical sections toward each other as torque is applied to the shaft, said cams in the driven pulley being shaped to exert a greater compressing force on the frusto-conical halves of the driven pulley than the cams of the driver pulley, spring means associated with said pulleys which serve to balance the difference in force exerted by the cams of the driver and driven pulleys, means associated with each of said pulleys for maintaining the drive ratio constant on a reversal of torque in the transmission system, the latter means comprising a plurality of serrated segments attached to the said drums and a like number of blades attached to the frusto-conical sections of the pulleys, said serrated segments and said blades being positioned to interlock upon a reversal of torque in the pulleys.

References Cited in the file of this patent

UNITED STATES PATENTS

| Number | Name | Date |
| --- | --- | --- |
| 2,168,744 | Perrine | Aug. 8, 1939 |
| 2,253,357 | Wetzel | Aug. 19, 1941 |
| 2,283,392 | Shadrick | May 19, 1942 |
| 2,478,289 | Lemon | Aug. 9, 1949 |
| 2,607,235 | Ruegenberg | Aug. 19, 1952 |

FOREIGN PATENTS

| Number | Country | Date |
| --- | --- | --- |
| 12,219 | Great Britain | 1904 |
| 30,003 | Great Britain | 1912 |
| 132,800 | Great Britain | Aug. 12, 1920 |
| 117,244 | Austria | Apr. 10, 1930 |